US008491266B2

(12) United States Patent  (10) Patent No.: US 8,491,266 B2
Ferenczy  (45) Date of Patent: Jul. 23, 2013

(54) FLUID ENERGY CONVERSION DEVICE

(76) Inventor: Joseph Ferenczy, Ft. Drum, FL (US)

(*) Notice: Subject to any disclaimer, the term of this patent is extended or adjusted under 35 U.S.C. 154(b) by 583 days.

(21) Appl. No.: 12/249,980

(22) Filed: Oct. 13, 2008

(65) Prior Publication Data

US 2010/0092296 A1 Apr. 15, 2010

(51) Int. Cl.
*F03D 3/06* (2006.01)

(52) U.S. Cl.
USPC .............. 416/200 R; 416/197 R; 416/198 R; 416/243

(58) Field of Classification Search
USPC ................. 416/197 R, 197 A, 198 R, 200 R, 416/243; 415/4.2, 4.4
See application file for complete search history.

(56) References Cited

U.S. PATENT DOCUMENTS

| 590,753 | A | | 9/1897 | Flaig | |
|---|---|---|---|---|---|
| 802,144 | A | | 10/1905 | Harrington | |
| 1,200,308 | A | * | 10/1916 | Bunnell | 415/211.1 |
| 2,431,111 | A | | 12/1943 | Du Brie | |
| 3,645,694 | A | * | 2/1972 | Flatau | 416/197 R |
| 3,877,836 | A | | 4/1975 | Tompkins | |
| 3,920,354 | A | | 11/1975 | Decker | |
| 4,321,005 | A | | 3/1982 | Black | |
| 5,057,696 | A | | 10/1991 | Thomas | |
| 5,285,112 | A | | 2/1994 | Mann | |
| 5,332,925 | A | | 7/1994 | Thomas | |
| 6,948,905 | B2 | | 9/2005 | Horjus | |
| 7,008,171 | B1 | * | 3/2006 | Whitworth | 416/243 |
| 7,215,037 | B2 | | 5/2007 | Scalzi | |
| 7,364,406 | B2 | * | 4/2008 | Kinkaid | 416/243 |
| 2004/0047723 | A1 | | 3/2004 | Horjus | |
| 2009/0285689 | A1 | * | 11/2009 | Hall et al. | 416/197 A |

FOREIGN PATENT DOCUMENTS

WO  WO 2007141367 A1 * 12/2007

* cited by examiner

*Primary Examiner* — Hung Vu
*Assistant Examiner* — Bryan Junge

(57) ABSTRACT

A fluid energy conversion device comprising a plurality of adjacent fluid catching modules that may be disposed about a central drive shaft, wherein the central drive shaft may be rotatably secured to a support frame. Each of the plurality of adjacent fluid catching modules may comprise two intake elements having a first fluid capturing aperture, an overlap portion, and a second fluid capturing aperture facing a direction opposite to that of the first fluid catching aperture. Adjacent fluid catching modules may be offset from each other by a predetermined angular position, thus allowing for at least one fluid catching aperture to be facing a directional fluid energy source at all times. The plurality of fluid catching modules may comprise different widths and form an overall conical configuration or the plurality of fluid catching modules may comprise equivalent widths and form an overall cylindrical configuration.

2 Claims, 3 Drawing Sheets

FLUID ENERGY CONVERSION DEVICE

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention relates to new and useful improvements in fluid energy conservation devices for harnessing fluid energy and, more particularly, to a modular fluid turbine installation for transforming fluid energies such as wind currents into a usable rotational force and for storing any excess energy generated by the fluid turbine installation.

2. Background Art

Energy needs of our society continue to grow at an increasing rate. Unfortunately, much of this energy is supplied by nonrenewable resources whose relative availability continues to decrease. Members of the power generation industry are gradually developing more efficient methods of power generation, with the ambition of one day generating their electricity from clean, sustainable renewable resources.

One such potential area for expansion is wind energy. Wind turbines of various sizes and designs can mitigate our dependence on foreign energy supplies while providing distinct benefits to our domestic economy. Wind turbine designs may be optimized for particular locations and conditions. Moreover, wind turbines use the wind, a clean, nonpolluting energy source.

The United States has tremendous wind energy resources. In California, wind farms currently replace almost 4 million barrels of oil per year. At least sixteen states have even greater wind potential than California based on measured average wind rates.

The installed wind energy generating capacity in the U.S. is currently estimated to be around 6,400 MW, and was expected to generate about 16.7 billion kWh of electricity in 2004, which was less than about 1% of the total U.S. electricity generation at that time. By contrast, the total amount of electricity that could potentially be generated from wind in the United States has been estimated at about 11,000 billion kWh annually, over three times the electricity generated in the U.S. today.

Existing wind farms help demonstrate how wind energy can help meet growing needs for affordable, reliable power. Moreover, with continued government encouragement through, among other things, heightened technology transfer from national laboratories to the wind energy industry, wind energy is slated to become more economical than traditional fossil-fueled energy. Some estimate that wind related energy sources could provide at least six percent of the nation's electricity by 2020. More importantly, wind generators could help revitalize farms and rural communities without consuming any natural resource or emitting any pollution or greenhouse gases.

Wind turbines have traditionally been built using a turbine attached to a horizontal axis suspended high above the ground. Wind turbines have been used for centuries to capture the power of the wind to mill grain into flour or pump water. More recently, as previously indicated, wind generators; such as a wind turbine configured to produce electricity, have also been used to supplement the electrical energy supply.

As noted, windmills and other wind-driven power generating apparatus have long been known in the art. Such apparatus are exemplified by the windmills and wind motors disclosed, for example, in U.S. Pat. Nos. 1,234,405; 2,431,111; 4,134,707; 4,321,005; and 6,948,905. One type of windmill apparatus is conventionally constructed with a plurality of vertically stacked, individual segments of two or more wind wheels or wind rotors, each of which is adapted to be drivingly connected to a common output drive shaft. By increasing the number of individual segments connected to the drive shaft, the greater the driving force or torque and, thereby, the greater the power that can be generated with the apparatus.

The wind motor apparatus of U.S. Pat. No. 2,431,111 includes a manually-operated, jaw-type positive clutch for selectively connecting and disconnecting wind wheel segments in series depending on the magnitude of the wind force or the output power desired. In this way, the apparatus is said to be adapted for operation in low or high wind currents or for operating, for example, more than one power consuming mechanism.

U.S. Pat. Nos. 1,234,405 and 4,134,707 both disclose wind turbine apparatus which comprise discrete wind wheel segments joined together in a vertical stack to form a unitary wind turbine. As the segments are added, they are rigidly interconnected to either the drive shaft or to each other from the lowermost to the topmost segment.

It is also known in the art to employ a windshield or casing for covering a portion of the blades of a wind wheel rotor so that the wind stream impinges on only those blades which are properly oriented with respect to the wind direction. U.S. Pat. Nos. 1,460,114 and 2,059,356, for example, disclose wind wheels having shields mounted for rotation about the periphery of a wind rotor. Wind vanes connected to the shields are said to cause the shields to respond to wind direction in a manner to present the most favorable rotor aspect to the wind stream, as well as to shield the blades from the force of the wind when the velocity thereof becomes sufficiently high to cause damage to the wind wheel installation.

Wind power may also be generated by a horizontal windmill, where wind catching devices rotate in a horizontal plane about a vertical axis. In a horizontal windmill, the wind catching devices are moving in a direction counter to the direction of the wind for one half of their rotational cycle, so the driving force of such a windmill is determined by the difference between the force generated on the front surface of wind catchers moving in the direction of wind flow versus the force generated on the back surface of the wind catchers moving against the direction of wind flow. A number of challenges relating to cost and effectiveness of horizontal wind catchers have led to a number of different windmill constructions.

An object of the present invention is to provide a fluid energy conservation device for efficiently developing electrical power from a wide range of fluid energy sources.

BRIEF SUMMARY OF THE INVENTION

In accordance with one embodiment, a fluid energy conversion device comprising a central drive shaft rotating about a central drive axis for delivering rotational output of the fluid energy conversion device and a plurality of fluid catching modules mounted on the central drive shaft and oriented perpendicular to the central drive shaft.

The fluid energy conversion device may further comprise a base plate disposed between each of the plurality of fluid catching modules and a support frame wherein the central drive shaft is securely and rotatably held within the support frame.

Each of the plurality of fluid catching modules may comprise two intake elements. The two intake elements may be formed by sectioning a symmetrical shape or mirrored image shape along an axial plane, wherein the two intake elements are shifted along the axial plane to create a first fluid catching aperture, an overlap section, and a second fluid catching aperture, the second fluid catching aperture facing a direction opposite to that of the first fluid catching aperture. Further, each of the plurality of fluid catching modules may be offset a predetermined angular position about the central drive shaft from each of the adjacent fluid catching modules.

DETAILED DESCRIPTION OF THE INVENTION

Figure 1:
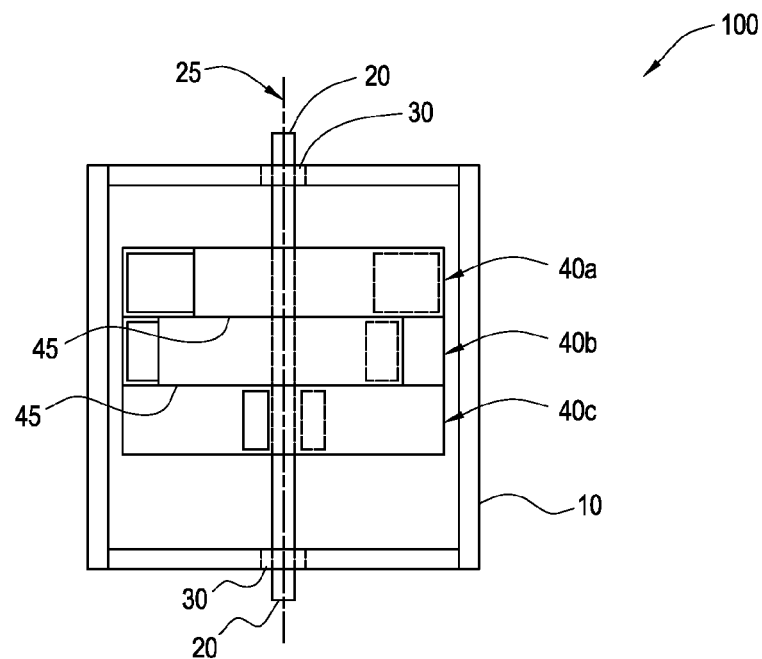
FIG. 1 depicts a side view of an embodiment of a fluid energy conversion device of the present invention.
Figure 2:
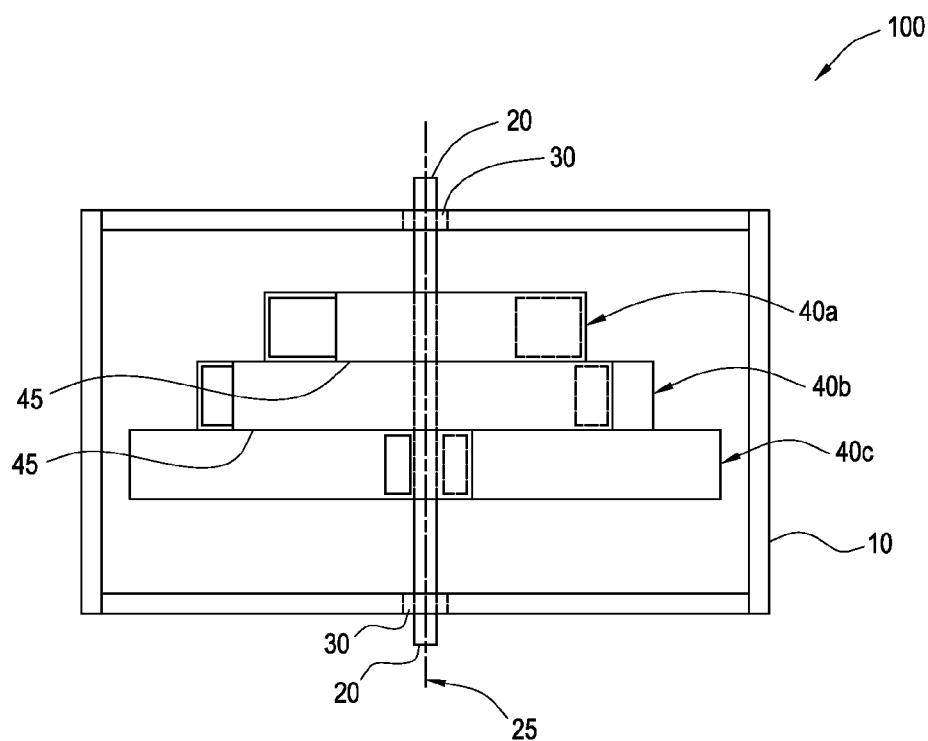
FIG. 2 depicts a side view of another embodiment of a fluid energy conversion device of the present invention.

One embodiment of the present inventive fluid energy conversion device 100 is illustrated in FIG. 1. Generally, the inventive device 100 may comprise a support frame 10 formed from any number of configurations. The style and/or construction of the support frame 10 is not critical to the present invention and may comprise any shape of a free-standing support frame 10 known within the art or the support frame 10 may be incorporated into any preexisting structure wherein the device 100 may be exposed to and receive a fluid force. The support frame 10 may rotatably secure a central drive shaft 20 in position along a central drive axis 25 by any means known within the art. In a preferred embodiment, bearings 30 rotatably support the fluid energy conversion device 100 within the support frame 10. FIGS. 1 and 2 depict the use of bearings 30 at the points of communication between the support frame 10 and the central drive shaft 20, but any means of axle attachment known within the art is within the scope of the present invention. In an alternative embodiment, a preexisting structure immediately adjacent the fluid energy conversion device 100 may communicate with the central drive shaft 20 and may function as the support frame 10 to which the device 100 is affixed.

One embodiment of the illustrated device 100 may use a two-stage energy conversion from fluid energy to rotational energy to electricity. Other embodiments may simply utilize a single stage conversion from fluid energy to mechanical energy. It will be appreciated that any type of mechanical energy transfer mechanism known within the art may provide for conversion of rotation energy of the central drive shaft 20 into electrical energy stored within an attached generator or any other known energy utilization/storage device. Any form of clutch mechanism known within the art may also be employed to both engage and disengage the central drive shaft 20 from the external utilization device, such as the aforementioned electric generator. Such a clutch means may include but is not limited to a ratchet and pawl-type clutch means and/or beveled gear means.

The functional elements of the fluid energy conversion device 100 may comprise a plurality of fluid catching modules 40. FIG. 1 depicts the use of three adjacent fluid catching modules 40a,40b,40c merely for the purpose of illustration, it being understood that a lesser or a greater number of fluid catching modules 40 may be employed in order to obtain a power output commensurate with the energy production desired from the device 100. Additionally, a base plate 45 may also be disposed between each adjacent fluid catching module 40. The number of base plates 45 used may be dependent on the number of fluid catching module 40 employed (see FIGS. 1-2). In one embodiment, as depicted in FIG. 1, each fluid catching module 40 may comprise an equivalent width thereby giving the fluid energy conversion device 100 a generally cylindrical configuration about the central drive shaft 20. In another embodiment, as depicted in FIG. 2, each of the fluid catching modules 40 may comprise a different width thereby giving the fluid energy conversion device 100 a generally conical configuration about the central drive shaft 20. Other embodiments within the scope of the present invention include random widths for each respective fluid catching module 40 or any combination of equal widths (e.g. cylindrical shape), different adjacent widths (e.g. conical shape), or randomized widths may be used in conjunction with one another within the same device 100. Preferably, the plurality of fluid catching modules 40 may be disposed perpendicular to the central drive shaft 20 as illustrated in FIGS. 1-2.

FIGS. 1-2 depict a plurality of fluid catching modules 40 having equal heights. The scope of the present invention also includes the use of variable heights for respective fluid catching modules 40. As one example, the bottom fluid catching module 40 may comprise the greatest height and such height values may progressively decrease in the fluid catching modules 40 there above, wherein the top fluid catching module 40 may comprise the shortest height of all. The inverse may also be true, wherein the height value of each adjacent fluid catching module 40 increases from the bottom fluid catching module 40 to the top fluid catching module 40. The height value of each fluid catching module 40 may also be randomly distinct (e.g. no progressive change in adjacent modules 40) from the height values of the other fluid catching modules 40 within the device 100.

Figure 3:
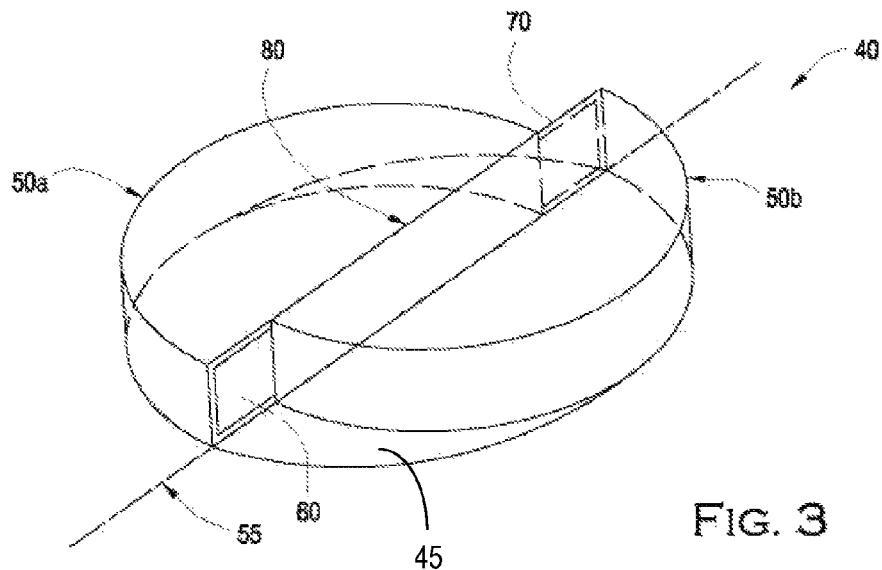
FIG. 3 depicts a perspective view of an embodiment of a fluid catching module of the present invention.

As depicted in FIG. 3, each fluid catching module 40 may comprise two intake elements 50a,50b. The intake elements 50 may be formed by sectioning a symmetrical shape or a rotationally symmetrical shape along a central plane 55 which passes through either the line of symmetry or the point of rotational symmetry, respectively. As shown in FIG. 3, one of the two intake elements 50a may then be slid along the central plane 55 relative to the other intake element 50b. In a preferred embodiment, the two intake elements 50 may be formed from a cylindrical shape sectioned along a line of symmetry, preferably a diameter of the cylindrical shape bisecting the central axis. In such a configuration, as depicted in FIG. 3, the fluid catching module 40 may further comprise a first fluid catching aperture 60, a second fluid catching aperture 70, and an overlap portion 80. The second fluid catching aperture 70 may be positioned to face a direction opposite that of the first fluid catching aperture 60. A fluid force entering the first fluid catching aperture 60 may cause the fluid catching module 40 and the central drive shaft 20 (not shown) to rotate in a clockwise direction. Half of a full rotation of the fluid catching module 40 then orients the second fluid catching aperture 70 into a position to extract the maximum force from the same fluid energy source.

Figure 4:
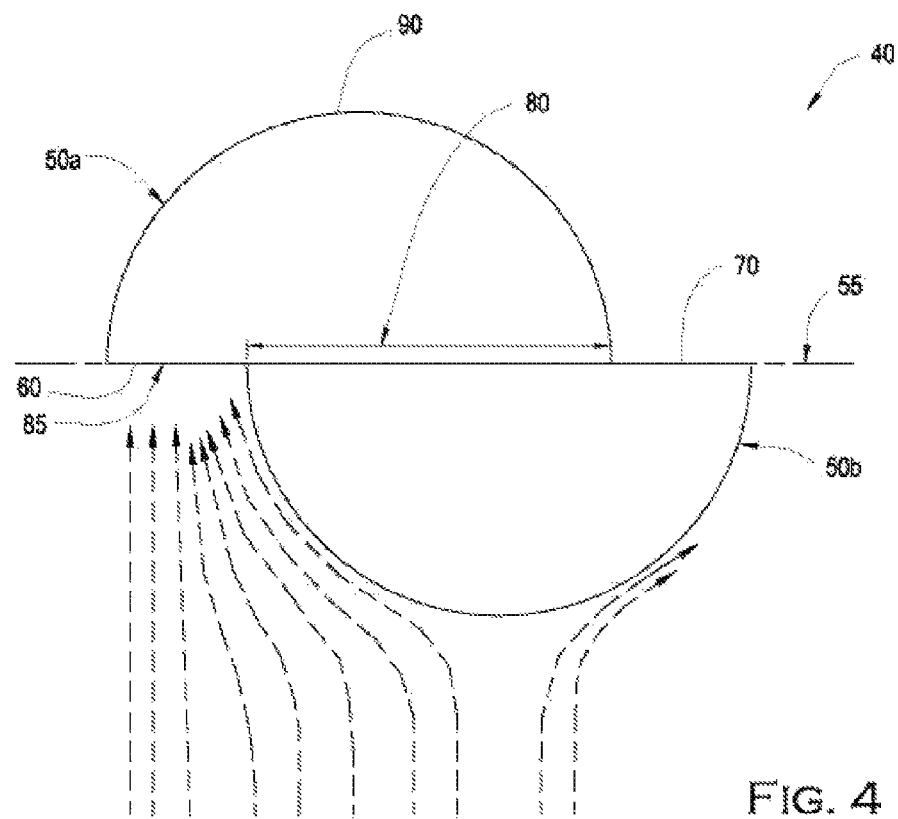
FIG. 4 depicts a top plan view of fluid action about an embodiment of a fluid catching module of the present invention.
Figure 5:
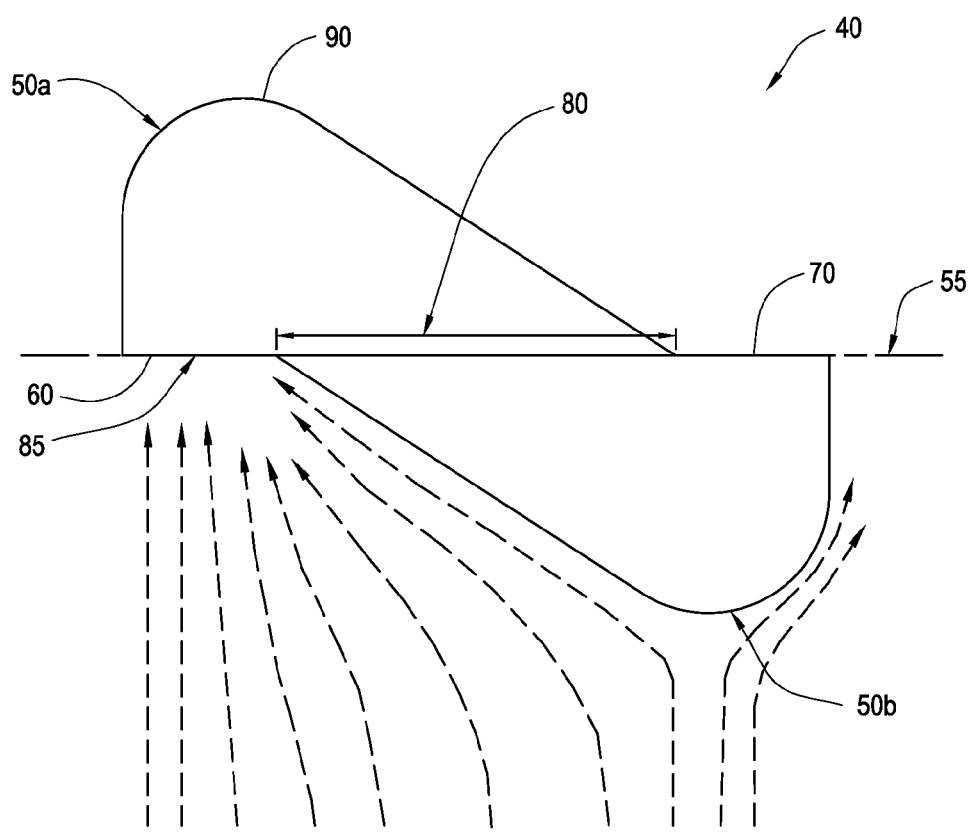
FIG. 5 depicts a top plan view of fluid action about another embodiment of a fluid catching module of the present invention.

FIGS. 4 and 5 depict top views of two possible embodiments of fluid catching modules 40 of the present invention. Each intake element 50 may have a front side 85 disposed along the central plane 55 and a rear side 90 disposed distal to the central plane 55. The front side 85 of one intake element 50*a* presents a greater resistance to fluid flow there over than the rear side 90 of the other intake element 50*b* when each respective side faces an upwind direction. The diminished resistance due to the streamlined surface along the rear side 90 may further facilitates the rotation of the fluid catching module 40 in a number of ways. First, the lower resistance and/or lower counterforce may allow the rear side 90 of one intake element 50*b* to be efficiently rotated forward against the incoming fluid force as the front side 85 of the other intake element 50*a* receives the full magnitude of the same fluid force. Second, the shape and configuration of the rear side 90 of one intake element 50*b* may enhance the device's 100 ability to channel additional fluid force into the fluid catching aperture 60 of the front side 85 of the other intake element 50*a*.

As shown in FIG. 4, intake elements 50 of a semicircular configuration provide for a rear side 90 that may assist in directing up to one half of the fluid force contacting the rear side 90 of an intake element 50*b* into the first fluid catching aperture 60. Such a configuration, and its beneficial function, may serve to greatly improve the rotational output of the present inventive fluid energy conversion device 100.

In another embodiment as shown in FIG. 5, rotationally symmetrical intake elements 50*a*,50*b* may further assist in generating a larger rotational output for the present inventive fluid energy conversion device 100. Additional fluid catching aperture area and/or a larger rear side 90 channeling surface may provide for increased power and driving force of the present device 100. In this manner, a much larger percentage of the fluid force contacting each fluid intake module 40 may be utilized to impart and enhance the rotational output of the energy conversion device 100.

Figure 6:
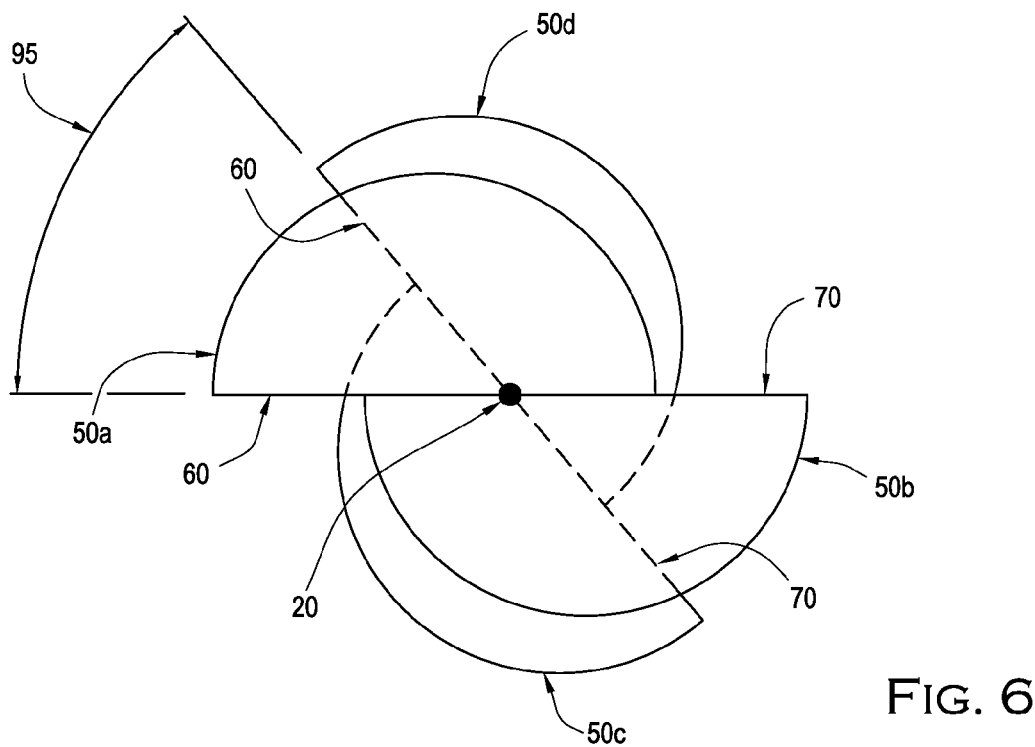
FIG. 6 depicts a top plan view of an embodiment of at least two fluid catching modules of the present invention having a predetermined angular offset.

As depicted in FIG. 6, offsetting adjacent fluid catching modules 40 by a predetermined angular position 95, may yet further assist in maximizing the rotational output that may be achieved by an energy conversion device 100 of the present invention. Two intake elements 50*a*,50*b* of a first fluid catching module 40 may be offset a predetermined angular distance 95 about the central drive shaft 20 relative to two intake elements 50*c*,50*d* of an adjacent second fluid catching module 40. The angular offsetting 95 of two or more adjacently disposed fluid catching modules 40 may allow for at least one fluid catching aperture 60,70 of at least one fluid catching module 40 to be oriented substantially perpendicular to any given fluid force contacting the device 100. Preferably, such predetermined angular offset positioning 95 may be incorporated whenever two or more fluid catching modules 40 comprise the present inventive device 100. With fluid catching aperture 60,70 of any given fluid catching module 40 out of alignment with the fluid catching apertures 60,70 of another fluid catching module 40 of the device 100, as a fluid force begins to lose its effect on one fluid catching aperture 60,70 through revolution of the device 100, another fluid catching aperture 60,70 of a different fluid catching module 40 may then be brought into position to receive the full force of the fluid energy source, and repeatedly thereafter, another fluid catching aperture 60,70 of yet another fluid catching module 40 may take the full fluid force thereby causing rotation of the fluid energy conversion device 100. By spacing the fluid catching modules 40 at regular angular intervals 95 about the central drive shaft 20, at least one of the wind catching apertures 60,70 of a plurality of fluid catching modules 40 may be oriented in a near maximal rotationally motivating position at any given time. This structure provides for a substantially constant pressure applied to the central drive shaft 20 to cause a substantially constant speed of rotation of the present inventive device 100 when in contact with a fluid force.

The predetermined offset angular position 95 may be influenced by the number of fluid catching modules 40 used within the fluid energy conversion device 100. In such a manner, a fluid catching aperture 60,70 may then be evenly spaced at a regular interval about the circumference of the device 100. The angular offset 95 may include any angle between zero degrees and one hundred eighty degrees. Preferable angular offsets may include but are not limited to fifteen degrees, thirty degrees, thirty-six degrees, forty-five degrees, sixty degrees, and ninety degrees.

When using three or more fluid catching modules 40 within a device 100, the angular offset 95 may be uniformly applied to sequentially adjacent fluid catching modules 40 forming a "spiraling path" of fluid catching apertures 60,70 about the circumference of the device 100. As an example, if the device 100 comprises six fluid catching modules 40, the first fluid catching aperture 60 of the first fluid catching module 40 may be disposed at zero degrees of angular offset 95, the first fluid catching aperture 60 of the second fluid catching module 40 may be disposed at thirty degrees of angular offset 95, the first fluid catching aperture 60 of the third fluid catching module 40 may be disposed at sixty degrees of angular offset 95, the first fluid catching aperture 60 of the fourth fluid catching module 40 may be disposed at ninety degrees of angular offset 95, the first fluid catching aperture 60 of the fifth fluid catching module 40 may be disposed at one hundred twenty degrees of angular offset 95, and the first fluid catching aperture 60 of the sixth fluid catching module 40 may be disposed at one hundred fifty degrees of angular offset 95. The second fluid catching aperture 70 of the first fluid catching module 40 would be inherently disposed at one hundred eighty degrees of angular offset 95 and reinitiates the sequential angular offsetting of the second fluid catching apertures 70 of the sequentially disposed fluid catching modules 40.

Such uniform sequential spacing via angular offset 95 may be adapted to overall number of fluid catching modules 40 being used within the device 100. If the device 100 comprises two fluid catching modules 40, the adjacent angular offset 95 may be ninety degrees; if the device 100 comprises three fluid catching modules 40, the adjacent angular offset 95 may be sixty degrees; if the device 100 comprises four fluid catching modules 40, the adjacent angular offset 95 may be forty-five degrees; if the device 100 comprises five fluid catching modules 40, the adjacent angular offset 95 may be thirty-six degrees; if the device 100 comprises six fluid catching modules 40, the adjacent angular offset 95 may be thirty degrees; and such a progression may continue for as many fluid catching modules 40 as necessary.

Alternatively, the angular offset 95 may be applied in a sequentially staggered angular offset configuration. As an example in a preferred embodiment, if the device 100 comprises six fluid catching modules 40, the fluid catching aperture 60 of the first fluid catching module 40 may be disposed at zero degrees of angular offset 95, the first fluid catching aperture 60 of the second fluid catching module 40 may be disposed at sixty degrees of angular offset 95, the first fluid catching aperture 60 of the third fluid catching module 40 may be disposed at one hundred twenty degrees of angular offset 95, the first fluid catching aperture 60 of the fourth fluid catching module 40 may be disposed at thirty degrees of angular offset 95, the first fluid catching aperture 60 of the fifth fluid catching module 40 may be disposed at ninety degrees of angular offset 95, and the first fluid catching aperture 60 of the sixth fluid catching module 40 may be disposed at one hundred fifty degrees of angular offset 95. The second fluid catching aperture 70 of the first fluid catching module 40 would be inherently disposed at one hundred eighty degrees of angular offset 95 and reinitiates the sequentially staggered angular offset configuration for the second fluid catching apertures 70 of the sequentially disposed fluid catching modules 40.

The scope of the angular offset 95 configuration of the present invention includes the above-mentioned sequentially adjacent angular offset, staggered angular offset, random angular offsets, and all other angular offset configurations known within the art.

While the above description contains much specificity, these should not be construed as limitations on the scope of any embodiment, but as exemplifications of the presently preferred embodiments thereof. For example, the above embodiments of fluid energy conversion devices 100 generally relate to wind catching devices, however, the scope of the present invention further includes all other sources of fluid force including but not limited to water driven embodiments. Likewise, devices 100 of the present invention may rotate about a variety of axes including but not limited to horizontal and/or vertical axes. Many other ramifications and variations are possible within the teachings of the various embodiments.

Thus the scope of the invention should be determined by the appended claims and their legal equivalents, and not merely by the examples given.

What is claimed is:

1. A fluid energy conversion device, comprising:
   a central drive shaft rotating about a central drive axis for delivering rotational output of said fluid energy conversion device;
   a plurality of fluid catching modules mounted on said central drive shaft and oriented perpendicular to said central drive shaft; and
   at least one base plate disposed between each of said plurality of fluid catching modules, each of said at least one base plate extends beyond an outer surface of said plurality of fluid catching modules and is configured to improve efficiency by directing additional fluid to said plurality of fluid catching modules;
   wherein each of said plurality of fluid catching modules is offset a predetermined angular position about said central drive shaft; and
   wherein said predetermined angular positions of said plurality of fluid catching modules about said central drive shaft comprise:
      a first intake element of a first fluid catching module disposed at an angular offset of zero degrees;
      a first intake element of a second fluid catching module disposed at an angular offset of sixty degrees;
      a first intake element of a third fluid catching module disposed at an angular offset of one hundred twenty degrees;
      a first intake element of a fourth fluid catching module disposed at an angular offset of thirty degrees;
      a first intake element of a fifth fluid catching module disposed at an angular offset of ninety degrees; and
      a first intake element of a sixth fluid catching module disposed at an angular offset of one hundred fifty degrees.

2. A fluid energy conversion device, comprising:
   a central drive shaft rotating about a central drive axis for delivering rotational output of said fluid energy conversion device; and
   a plurality of fluid catching modules mounted on said central drive shaft and oriented perpendicular to said central drive shaft;
   wherein each of said plurality of fluid catching modules is offset a predetermined angular position about said central drive shaft; and
   wherein said predetermined angular positions of said plurality of fluid catching modules about said central drive shaft comprise:
      a first intake element of a first fluid catching module disposed at an angular offset of zero degrees;
      a first intake element of a second fluid catching module disposed at an angular offset of sixty degrees;
      a first intake element of a third fluid catching module disposed at an angular offset of one hundred twenty degrees;
      a first intake element of a fourth fluid catching module disposed at an angular offset of thirty degrees;
      a first intake element of a fifth fluid catching module disposed at an angular offset of ninety degrees; and
      a first intake element of a sixth fluid catching module disposed at an angular offset of one hundred fifty degrees.

\* \* \* \* \*